United States Patent Office

Re. 26,330
Reissued Jan. 2, 1968

26,330

METHOD FOR INHIBITING DEPOSIT FORMATION IN HYDROCARBON FEED STOCKS

John M. Colfer, Cleveland, Ohio, assignor to The Lubrizol Corporation, Wickliffe, Ohio, a corporation of Ohio No Drawing. Original No. 3,235,484, dated Feb. 15, 1966, Ser. No. 182,967, Mar. 27, 1962. Application for reissue Mar. 24, 1967, Ser. No. 637,027
25 Claims. (Cl. 208—48)

Matter enclosed in heavy brackets [ ] appears in the original patent but forms no part of this reissue specification; matter printed in italics indicates the additions made by reissue.

*ABSTRACT OF THE DISCLOSURE*

*Deposit formation in refinery units, particularly units associated with the cracking process such as preheating stages, is inhibited by incorporating in the feed stock a small percentage (usually about 0.0012–0.04 weight percent) of an acylated amine prepared by reacting a hydrocarbon-substituted succinic acid with an alkylene amine or a hydroxyalkyl-substituted alkylene amine. It is desirable in some instances to dissolve additionally in the feed stock a minor proportion of a condensation product of formaldehyde and an amine with an alkylphenol.*

The present invention relates [as indicated], to improvements in processes for the cracking of hydrocarbons such as liquid petroleum hydrocarbons. In a more particular sense, it relates to a method for inhibiting the accumulation of harmful carbonaceous material in refinery *preheating stages and* cracking units.

Most of the gasoline produced today is obtained by the thermal or catalytic cracking of heavier petroleum hydrocarbon feed stocks such as light or heavy gas oils, cycle stocks, virgin or topped crude oils, lube stocks, kerosene, and kerosene-gas oil mixtures. A number of different thermal and/or catalytic cracking processes known in the petroleum industry under designations such as Fluid Process, Thermofor, Houdry, Platforming, Thermal Reforming, Viscosity-Breaking, etc., are employed for the purpose. Although these various processes differ considerably as to the precise manner in which the heavier hydrocarbon molecules are cracked to yield gasoline, they all involve the heating of the hydrocarbon feed stock to a high temperature (370°–1200° F.) and the passage of such heated stock, optionally mixed with a cracking catalyst, through heated tubes, reactors, convertors, and tower stills. Regardless of the particular process used, the cracking operation always results in the formation of some undesirable carbonaceous material or "refinery coke" which adheres to the tubes, reactors, etc., of the cracking unit and lowers its efficiency, principally by impeding the flow of the feed stock therethrough and the transfer of heat to or from such stock. After enough carbonaceous material has accumulated on the various parts of the cracking unit to lower its efficiency substantially, the unit must be dismantled, cleaned, and reassembled. Of course, such cleaning operations are not only tedious and costly, but result in a large proportion of "down-time" during which the unit is not functioning. Although the use of modern Platforming and catalytic cracking processes has reduced the amount of down-time as compared with older, strictly thermal cracking processes, the accumulation of refinery coke still presents a problem to the petroleum refining industry.

It is, therefore, an object of the present invention to inhibit the accumulation of harmful carbonaceous material in refinery cracking units.

Another object is to disperse the carbonaceous material formed during the cracking of a hydrocarbon feed stock throughout said feed stock and thereby inhibit its accumulation on the various parts of refinery cracking units.

Yet another object is to reduce the amount of down-time in the operation of refinery cracking units.

These and other objects of the invention are realized by the provision of a method for inhibiting the accumulation of carbonaceous material in a refinery [cracking] unit during the [cracking] *passage* of a hydrocarbon feed stock [therein] *therethrough* which comprises dissolving in said feed stock a minor proportion, generally at least about 0.0012 weight percent and preferably from about 0.0012 to about 0.04 weight percent, of an oil-soluble acylated amine prepared by mixing a substituted succinic compound selected from the class consisting of substituted succinic acids having the structural formula

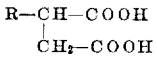

and substituted succinic anhydrides having the structural formula

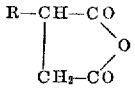

in which structural formulas R is a large, substantially aliphatic hydrocarbon radical having at least about 50 carbon atoms, with at least about one-half an equivalent amount of an amine selected from the group consisting of alkylene amines and hydroxyalkyl substituted alkylene amines, and heating the resulting mixture to effect acylation and remove the water formed thereby.

It is also desirable, in some instances, to dissolve additionally in the hydrocarbon feed stock a minor proportion of a product prepared by heating one equivalent of an alkylphenol with from about 0.1 to about 10 equivalents each of a formaldehyde-yielding reagent and an amine for about 0.5 to about 10 hours at 80°–250° C. and removing the water which is formed. In addition, benefit is also derived in many cases by the incorporation in the hydrocarbon feed stock of known oxidation inhibitors such as hindered phenols (e.g., 2,6-di-tertiary-butyl-4-methyl-phenol and 4,4'-methylene-bis-(2,6-di-tertiary-butylphenol), aminophenols, N-alkylated phenylene diamines, phenothiazine, mercapto-benzothiazole, etc.)

The oil-soluble acylated amine required for the purposes of this invention is described in detail in the copending application of W. M. Le Suer et al., Ser. No. 802,667, filed March 30, 1959, now Patent No. 3,172,892. In the interest of not unduly lengthening the present specification it is intended that the disclosure of the said Le Suer et al. application be considered as forming a part of the present specification.

In summary, application Ser. No. 802,667 deals with mixing a substituted succinic compound selected from the class consisting of substituted succinic acids having the structural formula

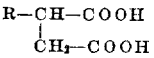

and substituted succinic anhydrides having the structural formula

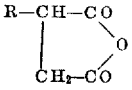

in which structural formulas R is a large, substantially aliphatic hydrocarbon radical having at least about 50 carbon atoms, with at least about one-half an equivalent amount of an ethylene amine, and heating the resulting mixture to effect acylation and remove the water formed thereby.

The size of the substituent on the succinic acid or anhydride is of importance in the preparation of the acylated amine because it allows the preparation of a product which satisfies the objects of this invention. It is important that this substituent be large, that it have at least about 50 carbon atoms and preferably at least about 60 carbon atoms in its structure. When this substituent has substantially less than 50 carbon atoms, the resulting acylated amine is ineffective for the purpose of this invention, i.e., it does not have the ability to reduce the accumulation of carbonaceous material in refinery units.

The substituent groups are substantially aliphatic hydrocarbon radicals, including both alkyl and alkenyl radicals. They are commonly derived from polyolefins such as polyethylene, polypropylene, polybutene, polyamylene, etc., containing from about 50 to about 7000 or more carbon atoms, although they may be derived from any large, substantially aliphatic hydrocarbon.

The substituted succinic acids and anhydrides which are contemplated as reactants in the process for the preparation of the acylated amine are readily available from the reaction of maleic anhydride with a high molecular weight olefin or a chlorinated high molecular weight olefin. The product from such a reaction is the corresponding alkenyl succinic anhydride. The reaction involves merely heating these two reactants at a temperature of about 150 to 200° C. The reactants in each case are illustrated by the following equations:

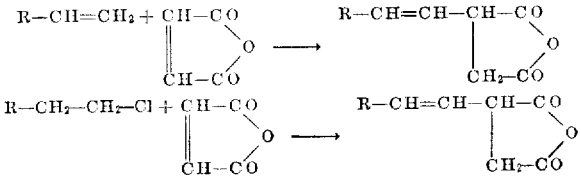

In some instances, it is also desirable to make the substituted succinic compound by introducing chlorine into a heated mixture of maleic anhydride and the polyolefin. It will be appreciated that the reaction may not go precisely as indicated above, especially with respect to the particular carbon atom of the olefin or chlorinated olefin reactant which ultimately becomes attached to the maleic acid or anhydride reactant, but other than this the equations are believed to be illustrative. Furthermore, although the product of this reaction has been indicated as being an alkenyl succinic anhydride, it is apparent that similar products can be prepared by this process in which the substituent is something other than an alkenyl group. For the purpose of the present invention this substituent should, however, be substantially aliphatic and in most cases, of course, it will be an alkyl or alkenyl group. In some cases, however, it may be desirable to employ a substituted succinic anhydride in which the substituent is derived from a copolymer of styrene and isobutylene, or of a substituted styrene and some other aliphatic olefin In these cases the copolymer will be substantially aliphatic, that is, the composition of the copolymer will be such that the non-aliphatic portion does not substantially exceed about 30 percent of the whole. Thus, a copolymer of 90 percent of isobutene and 10 percent of styrene or of 80 percent of propylene and 20 percent of alpha-methylstyrene is useful to provide the large, substantially aliphatic substituent.

The most commonly used sources of the substantially aliphatic hydrocarbon substituents are the polyolefins. These are illustrated by polyethylene, polypropylene, polyisobutene, polyisoamylene, polyisohexylene, etc. A particularly preferred polyolefin for this use is polyisobutene. Thus the condensation of a polyisobutene containing at least about 50 carbon atoms, preferably at least about 60 carbon atoms, and most desirably from about 100 to about 130 carbon atoms, with maleic anhydride yields an alkenyl succinic anhydride which upon further reaction with an ethylene amine produces a material which is particularly effective as the acylated amine required for the purposes of the present invention.

The substituted succinic anhydride ordinarily is reacted directly with the ethylene amine, although in some instances it may be desirable first to convert the anhydride to the acid before reaction with the ethylene amine. In other circumstances it may be desirable to prepare the substituted succinic acid by some other means and to use an acid prepared by such other means in the process. In any event, either the acid or the anhydride may be used in the preparation of the acylated amine.

The term "ethylene amine" is used in a generic sense to denote a class of polyamines conforming for the most part to the structure $$H_2N(CH_2-\underset{\underset{R}{|}}{CH}NH)_xH$$

in which x is an integer and R is a low molecular weight alkyl radical or hydrogen. Thus it includes, for example, ethylene diamine, diethylene triamine, triethylene tetramine, tetraethylene pentamine, pentaethylene hexamine, etc. These compounds are discussed in some detail under the heading "Ethylene Amines" in "Encyclopedia of Chemical Technology," Kirk and Othmer, volume 5, pages 898–905, Interscience Publishers, New York (1950). Such compounds are prepared most conveniently by the reaction of ethylene dichloride with ammonia. This process results in the production of somewhat complex mixtures of ethylene amines, including cyclic condensation products such as piperazines, and these mixtures find use in the preparation of the acylated amine. On the other hand, quite satisfactory products may be obtained also by the use of pure ethylene amines. An especially useful ethylene amine for reasons of economy as well as effectiveness is a mixture of ethylene amines prepared by the reaction of ethylene chloride and ammonia, having a composition which corresponds to that of tetraethylene pentamine. This is available in the trade under the trade name "Polyamine H." Another group of very useful ethylene [amine, with a preference expressed for a mixture of about] *amines are mixtures of one part by weight of triethylene* tetramine with 0.1–10 parts by weight of diethylene triamine, with a preference expressed for a mixture of about 3 parts of triethylene tetramine with about 1 part of diethylene triamine.

It has been noted that at least about one-half an equivalent of the ethylene amine per equivalent of the substituted succinic compound should be used to produce a product which is satisfactory for the purposes of the present invention. Amounts of the ethylene amine ranging from about 0.5 to about 8 equivalents, preferably from about 1 to about 4 equivalents, per equivalent of substituted succinic compound are generally used. Amounts greater than 8 equivalents of ethylene amine per equivalent of substituted succinic compound may also be used if desired, but there appears to be no advantage in the use of such large amounts of the ethylene amine reactant. The chemical equivalency of the ethylene amine reactant is based upon the nitrogen content, i.e., one having 4 nitrogens per molecule has 4 equivalents per mole.

In the preparation of the acylated amine, the ethylene amine and the substituted succinic compound are mixed and heated at a temperature within the range from about 80° C. to about 200° C., preferably 100° C. to 160° C., until most or all of the water of reaction has been removed. Thus, a useful method of carrying out this step is to add some toluene or xylene to the reaction mixture and remove the water of reaction by azeotropic distillation.

It has also been found that in lieu of the ethylene amine reactant, one can use for the purpose of the present invention any alkylene amine or hydroxyalkyl substituted alkylene amine reactant conforming for the most part to the structure $$HN(-Q-\underset{\underset{A}{|}}{N}-)_nH$$

in which n is an integer, A is hydrogen, a hydrocarbon radical, or a hydroxyalkyl radical, and Q is a divalent aliphatic radical containing at least 2 carbon atoms. The A substituents in the above formula can also be considered as forming a divalent alkylene radical, in which instance a cyclic structure results. Q is generally an alkylene radical such as ethylene, trimethylene, tetramethylene, etc., although in certain instances it may be an aliphatic radical which contains ether or sulfide substituents such as, e.g., an —alkylene-O-alkylene— or —alkylene-S-alkylene— radical.

Specific examples of such amine reactants are trimethylene diamine, di-(trimethylene)triamine, tris - (trimethylene)tetramine, tri-(hexamethylene)tetramine, decamethylene diamine, N-octyl trimethylene diamine, N,N'-dioctyl trimethylene diamine, N-(2 - hydroxyethyl)ethylene diamine, piperazine, 1-(2-aminopropyl)piperazine, 1,4-bis-(2-aminoethyl)piperazine, 1-(2 - hydroxethyl)piperazine, di - (hydroxypropyl)substituted tetraethylene pentamine, N-3-(hydroxypropyl)tetramethylene diamine, pyrimidine, 2-methyl-imidazoline, polymerized ethylene imine, and 1, 3-bis-(2-aminoethyl)imidazoline.

Specific examples of acylated amines which are disclosed in detail in application Ser. No. 802,667 and which are useful as the acylated amine herein are shown in Table I.

C. After the initial exothermic reaction subsides, the whole is heated for 5 hours at 155° C. The water of reaction is collected in a sidearm water trap and amounts to about 26 grams. The reaction mass is then stripped of solvent by heating at 160° C./5 mm. Hg until distillation ceases. The residue is an acylated amine having a nitrogen content of 7.54 percent.

Example 2

In a manner like that described in Example 1, 249 grams (4 equivalents based on nitrogen) of bis-(3-aminopropyl)amine is mixed with a solution in 266 grams of toluene of 920 grams (1.33 equivalents) of a polyisobutene-substituted succinic anhydride similar to that described in Example 1 but having an equivalent weight of 690. The whole is heated for 6 hours under reflux and then heated to 220° C./3 mm. Hg to remove the solvent. The residue is an acrylated amine having a nitrogen content of 4.0 percent.

Example 3

In a manner like that described in Example 1, 333 grams (3.78 equivalents based on nitrogen) of bis-(3-aminopropyl)ether of ethylene glycol is reacted with 1000 grams (1.89 equivalents) of a polyisobutene-substituted succinic anhydride similar to that described in Example 1 but having an equivalent weight of 530, using 300 grams of xylene as a reaction solvent. Upon removal of the xylene solvent, the acylated amine remains as the residue. It contains 4 percent nitrogen.

TABLE I

| Example No. of Serial No. 802,667 | Acylated Amine Prepared From— | | | |
|---|---|---|---|---|
| | Succinic compound | Equivalents | Amine | Equivalents |
| 1 | Polyisobutene [1] substituted succinic anhydride. | 1.0 | Diethylene triamine | 1.0 |
| 2 | do | 1.0 | Ethylene diamine | 1.0 |
| 3 | do | 1.0 | An ethylene amine mixture corresponding to triethylene tetramine. | 1.5 |
| 4 | do | 1.0 | Triethylene tetramine | 1.5 |
| 5 | do | 0.78 | "Polyamine H" | 1.55 |
| 6 | do | 1.0 | Ethylene diamine | 1.5 |
| 7 | Polyisobutene [2] substituted succinic anhydride. | 1.0 | "Polyamine H" | 1.0 |
| 10 | Polypropylene [3] substituted succinic anhydride. | 0.52 | do | 0.52 |
| 12 | Isobutene-styrene copolymer [4] substituted succinic anhydride. | 0.51 | "Polyamine H" | 0.51 |
| 17 | Polyisobutene [5] substituted succinic anhydride. | 2.55 | do | 2.55 |

[1] Polymer contains an average of about 60 carbon atoms.
[2] Polymer contains an average of about 71 carbon atoms.
[3] Polymer contains an average of about 62 carbon atoms.
[4] Copolymer contains an average of about 86 carbon atoms and a weight ratio of isobutene units: styrene units of 94.6.
[5] Polymer contains an average of about 3,600 carbon atoms.

Additional examples of acylated amines useful for the purposes of this invention are as follows. Unless specified otherwise, all parts and percentages are by weight.

Example 1

A polyisobutene-substituted succinic anhydride is prepared by the reaction of a chlorinated polyisobutene (ca. 4 percent chlorine content) with maleic anhydride at 200° C. for a period of about 4 hours. The polyisobutene has an average molecular weight of 850 (i.e., contains an average of about 60 carbon atoms per mole) and the resulting alkenyl succinic anhydride is found to have an equivalent weight of 515. A mixture of 3 parts of triethylene tetramine and 1 part of diethylene triamine, by weight, in the amount of 279 grams (7.76 equivalents based on nitrogen) is added to a solution of 1000 grams (1.94 equivalents) of the alkenyl succinic anhydride in 200 grams of toluene over a period of 4 minutes at 57–88°

Example 4

In a manner like that described in Example 1, 418 grams (3.78 equivalents based on nitrogen) of bis-3-aminopropyl)ether of diethylene glycol is reacted with 1000 grams (1.89 equivalents) of a polyisobutene-substituted succinic anhydride similar to that described in Example 1 but having an equivalent [weighs] *weight* of 530, using 300 grams of toluene as a reaction solvent. Upon removal of the toluene solvent, the acylated amine remains as the residue. It contains 3.8 percent nitrogen.

Example 5

In a manner like that described in Example 1, 194 grams (3.74 equivalents based on nitrogen) of N-(2-aminoethyl)ethanolamine is reacted with 1000 grams (1.87 equivalents) of a polyisobutene-substituted succinic anhydride similar to that described in Example 1 but having an equivalent weight of 535, using 786 grams of toluene as a reaction solvent. Upon removal of the toluene solvent, the acylated amine remains as the residue. It contains 4.3 percent nitrogen.

Example 6

1000 parts of a polyisobutene having a molecular weight of about 1500 (contains an average of about 107 carbon atoms per mole) and 123 parts of maleic anhydride are introduced into a reaction vessel and heated to 175° C. 270 parts of chlorine gas is introduced slowly into the heated reaction mass at a temperature of 175°–200° C. over a period of about 16 hours. The resulting polyisobutene-substituted succinic anhydride shows a saponification number of 116.

524.3 parts (1.074 equivalents) of the above-described polyisobutene-substituted succinic anhydride, 51.3 parts (1.429 equivalents based upon nitrogen) of a mixture of 3 parts by weight of triethylene tetramine with 1 part by weight of diethylene triamine, and 241.8 parts of xylene solvent are heated for 10.75 hours at 150–155° C. while water is removed by means of a side-arm water trap. The product, a 70 percent solution of the desired acylated amine in xylene solvent, contains 2.22 percent nitrogen.

Example 7

2170 parts of a polyisobutene having an average molecular weight of about 900 (equivalent to about 65 carbon atoms per mole) is introduced into a reaction vessel and heated to 104° C. 226.8 parts of chlorine gas is introduced over an 8.5 hour period while the reaction temperature is maintained between 105 and 110° C. Thereafter, the whole is blown with nitrogen gas for 0.5 hour to remove any occluded HCl. There is obtained 2280 parts of a chlorinated polyisobutene containing 4.4 percent chlorine. This chlorinated polyisobutene is mixed with 250 parts of maleic anhydride and the whole is heated from 105° C. to 200° C. over a 10-hour period. The product in the reaction vessel is a polyisobutene-substituted succinic anhydride having a saponification number of 101 and an equivalent weight of 555.

1110 parts (2.0 equivalents) of the above-described polyisobutene-substituted succinic anhydride, 800 parts of SAE 10 mineral oil, and 108 parts (2.0 equivalents) of a commercial, polymerized ethylene imine having a molecular weight of about 1200 and containing 25.9 percent nitrogen (available under the trade designation "Polyamine 1200") are added to a reaction vessel in the stated order. An exothermic reaction causes the temperature to rise 20° C. The whole is then heated for 5 hours at 150–155° C. while nitrogen is blown therethrough to remove the water of reaction. The product, a 60 percent solution of the desired acylated amine in SAE 10 mineral oil, is found to contain 1.42 percent nitrogen.

As indicated previously, it is also desirable in some instances to dissolve additionally in the hydrocarbon feed stock a minor proportion, generally from about 0.0003 to about 0.02 weight percent, of a product prepared by heating 1 equivalent of an alkylphenol with from about 0.1 to about 10 equivalents of a formaldehyde-yielding reagent and an amine for about 0.5 to about 10 hours at 80°–250° C. and removing the water which is formed. If desired, a solvent such as toluene or xylene may be added to the reaction mixture to assist in the removal of water. The incorporation of such a product in a hydrocarbon feed stock appears to inhibit to a certain extent the formation of carbonaceous material and thus aids the acylated amine in its role of inhibiting the accumulation of said carbonaceous material in refinery cracking units.

The alkylphenol reagent may be either a mono-alkyl or a poly-alkyl phenol. The alkyl groups may be of any size, ranging from methyl up to alkyl groups derived from polyolefins having molecular weights as high as 50,000 or more. Preferably the alkylphenol is a mono-alkyl phenol in which the alkyl group contains from 1 to about 30 carbon atoms, preferably at least about 4 carbon atoms. Typical examples of useful alkyl phenols include, e.g., ortho, meta, and para-cresols; ortho, and para-ethylphenols; ortho, para-diethylphenol, para-isopropylphenol, para-tertiary butylphenol, ortho n-amylphenol, para-tertiary amylphenol, heptylphenol, diisobutylphenol, n-decylphenol, wax-alkylated alpha-naphthol, wax-alkylated phenol, and polyisobutene-substituted phenol in which the polyisobutene substituent contains from about 12 to about 76 carbon atoms. The alkylphenol may also contain substituent groups such as, e.g., chloro, fluoro, nitro, alkoxy, sulfide, nitroso, etc. A particular preference is expressed for heptylphenol. Also useful are polyhydric phenols such as alkylated resorcinols, alkylated catechols, alkylated pyrogallols, and their substitution products. For the purposes of the present specification and claims, one equivalent of an alkylphenol is the same as one mole thereof.

The formaldehyde-yielding reagent may be any one of the various formaldehydes or formaldehyde derivatives such as formaldehyde gas, formalin, alpha-trioxymethylene, paraformaldehyde, formaldehyde dipropylacetal, formaldehyde dimethylacetal, and the like. One equivalent, as applied to the formaldehyde-yielding reagent, is that amount which supplies one mole of HCHO.

The amine reagent may be any one of the various substituted or unsubstituted amines such as the alkylene amines and the hydroxyalkyl-substituted alkylene amines described earlier in connection with the preparation of the acylated amine, as well as any of the various aliphatic, cycloaliphatic, or heterocyclic amines such as aminoethyl piperazine, 2,2,4,6,6-pentamethyl tetrahydropyrimidine, ethylamine, diethylamine, diallylamine, ethanolamine, diethanolamine, 2-methyl-2-aminopropanol-1, cyclohexylamine, dicyclohexylamine, methylcyclohexylamine, octylamine, dioctylamine, stearylamine, and tertiary-alkyl primary amines such as tertiary-dodecyl primary amine, tertiary-tetradecyl primary amine, etc., a number of which primary amines are available commercially under the trade designation "Primenes." In some instances, it is also possible to use aromatic amines either alone or in admixture with any of the above-described non-benzenoid amines. Examines of useful aromatic amines include aniline, N-methyl aniline, alpha-naphthylamine, beta-naphthylamine, etc. It is preferred, however, to use an alkylene amine, with a further preference expressed for an ethylene amine. With respect to the amine reagent employed, it appears to be necessary only that it contain at least one amino hydrogen atom (i.e., a hydrogen atom bonded to an amino nitrogen atom). As set forth earlier, for the purposes of the present specification and claims one equivalent of an amine is that amount of an amine which contains one nitrogen atom, thus, one mole of an amine such as ethylene diamine contains 2 equivalents thereof.

The following specific examples illustrate in detail the preparation of alkylphenol-formaldehyde-amine reaction products which are useful as auxiliary addition agents for the purposes of the present invention. Unless specified otherwise, all parts and percentages are by weight.

Example 8

2500 grams (13.02 equivalents) of heptylphenol, 500 grams of xylene solvent, 215 grams (5.21 equivalents) of a commercial mixture of ethylene amines having a composition corresponding to that of tetraethylene pentamine, 165 grams (5.21 equivalents) of commercial, 95 percent. paraformaldehyde are added in the stated order to a reaction vessel. An exothermic reaction causes the temperature of the reaction mass to rise to about 50° C. The whole is then heated from 100° C. to 160° C. over a period of 2.5 hours while the xylene-water azeotrope is removed. 105 grams of water is separted from the xylene-water azeotrope and the xylene is added to the cooled contents of the reaction vessel. 689 grams of additional xylene is added and the whole is filtered. The filtrate, a 70 percent solution of the desired product in xylene, is found to contain 1.84 percent nitrogen.

Example 9

1098 grams (5.71 equivalents) of heptylphenol, 541 grams of xylene solvent, 108 grams (2.855 equivalents) of tetraethylene pentamine, and 90.3 grams (2.855 equivalents) of commercial, 95 percent paraformaldehyde are added in the stated order to a reaction vessel. An exothermic reaction causes the temperature to rise to about 40° C. The whole is then heated from 105° C. to 162° C. over a period of 1.75 hours while water is removed as a xylene-water azeotrope. The water (61 grams) is removed from the xylene-water azeotrope and the xylene is returned to the cooled reaction vessel. Filtration of the reaction vessel contents yields the product, a 70 percent solution of the desired alkylhpenol-formaldehyde-amine reaction product in xylene solvent. The product is found to contain 2.0 percent nitrogen.

Example 10

688 grams (3.34 equivalents) of diisobutylphenol, 327 grams of xylene solvent, 54.5 grams (1.339 equivalents) of a commercial mixture of ethylene amines having a composition corresponding to that of tetraethylene pentamine, and 42 grams (1.338 equivalents) of commercial, 95 percent paraformaldehyde are added to a reaction vessel in the stated order. An exothermic reaction carries the temperature to 60° C. The whole is then heated from 100° C. to 168° C. over a two-hour period while water azeotrope. The water (29 grams) is separated and the xylene is returned to the cooled reaction vessel. The product, a 70 percent solution of the alkylphenol-formaldehyde-amine reaction product in xylene, is found to contain 1.76 percent nitrogen.

Example 11

1982 grams (4.27 equivalents) of polyisobutene-substituted phenol in which the polyisobutene substitutent contains an average of about 20 carbon atoms, 200 grams of toluene, 806 grams (21.35 equivalents) of tetraethylene pentamine, and 134 grams (4.27 equivalents) of commercial, 95 percent paraformaldehyde are added to a reaction vessel in the stated order. An exothermic reaction causes the temperature to rise to 39° C. The whole is heated from 113° C. to 205° C. over a period of 4 hours and the toluene-water azeotrope is collected. 90 grams of water is separated from the toluene-water azeotrope. The residue in the flask is stripped to 238° C./2 mm. Hg. and then diluted with 405 grams of SAE 10 mineral oil. The product, an 85 percent solution of the alkylphenol-formaldehyde-amine reaction product in mineral oil, is found to contain 6.01 percent nitrogen.

Example 12

262 grams (1 equivalent) of dodecyl phenol, 121 grams of xylene solvent, 16.5 grams (0.4 equilavent) of a commercial mixture of ethylene amines having a composition corresponding to that of tetraethylene pentamine, and 13 grams (0.4 equivalent) of commercial, 95 percent paraformaldehyde are added in the stated order to a reaction vessel. An exothermic reaction causes the temperature to rise from 25° C. to about 30° C. The whole is heated from 115° C. to 185° C. while water is removed by means of the xylene-water azeotrope. The water (8.5 grams) is separated from the xylene and the xylene is returned to the cooled reaction vessel. The product, a 70 percent solution of the desired alkylphenol-formaldehyde-amine reaction product in xylene, is found to contain 1.39 percent nitrogen.

Example 13

672 grams (3.5 equivalents) of heptylphenol, 497 grams of xylene solvent, 452 grams (10.5 equivalents) of aminoethyl-piperazine, and 110.5 grams (3.5 equivalents) of commercial, 95 percent paraformaldehyde are added in the stated order to a reaction vessel. An exothermic reaction causes the temperature to rise from 23° C. to 72° C. The whole is heated from 94° C. to 150° C. over a period of 4.5 hours while water is removed by means of the xylene-water azeotrope. Water (77 grams) is separated from the xylene-water azeotrope and the xylene is returned to the cooled reaction vessel. The product, a 70 percent solution of the desired alkylphenol-formaldehyde-amine reaction product in xylene, is found to contain 8.6 percent nitrogen.

Example 14

1156 grams (6.02 equivalents) of heptylphenol, 1017 grams of xylene solvent, 1150 grams (6.02 equivalents) of a commercial mixture of $C_{12}$–$C_{15}$ tertiary-alkyl primary-amines, and 190 grams (6.02 equivalents) of commercial, 95 percent paraformaldehyde are added in the stated order to a reaction vessel. An exothermic reaction causes the temperature to rise to 38° C. The whole is then heated from 96° C. to 175° C. over a period of 3.75 hours while water is removed by means of the xylene-water azeotrope. The water (124 grams) is separated from the xylene-water azeotrope and the xylene is returned to the cooled reaction vessel. The product, a 70 percent solution of the desired alkylphenol-formaldehyde-amine reaction product in xylene solvent, is found to contain 2.44 percent nitrogen.

Example 15

478 grams (2.49 equivalents) of heptylphenol, 319 grams of xylene solvent, 242 grams (2.49 equivalents) of diallylamine, and 79 grams (2.49 equivalents) of commercial, 95 percent paraformaldehyde are added in the stated order to a reaction vessel. An exothermic reaction carries the temperature from 22° C. to 63° C. The whole is then heated from 98° C. to 164° C. over a period of 4.75 hours while water is removed by means of the xylene-water azeotrope. The water (54 grams) is separated from the xylene-water azeotrope and the xylene is returned to the cooled reaction vessel. Filtration of the xylene solution yields the product, a 70 percent solution of the desired alkylphenol-formaldehyde-amine reaction product in xylene. It is found to contain 3.08 percent nitrogen.

Example 16

995 grams (5.18 equivalents) of heptylphenol, 512 grams of xylene solvent, 184.5 grams (2.056 equivalents) of 2-amino-2-methyl-1-propanol, and 65.5 grams (2.056 equivalents) of commercial, 95 percent paraformaldehyde are added in the stated order to a reaction vessel. An exothermic reaction carries the temperature from 35° C. to about 45° C. The whole is then heated from 130° C. to 159° C. over a period of 1.25 hours while water is removed by means of the xylene-water azeotrope. The water (46 grams) is separated from the xylene-water azeotrope and the xylene is returned to the cooled reaction vessel. The product, a 70 percent solution of the desired alkylphenol-formaldehyde-amine reaction product in xylene, is found to contain 1.56 percent nitrogen.

The value of the herein described method of preventing the accumulation of carbonaceous material in refinery cracking units was investigated by means of a laboratory test apparatus known as a "CRC (Committee on Fuel Research) Fuel Coker," Model 01FC–61, manufactured by the Erdco Engineering Corporation of Addison, Illinois. A description of the test apparatus and test procedure follows.

The hydrocarbon feed stock to be tested is stored in a five-gallon reservoir from which it is pumped through a rotameter to the test apparatus. The pump, which maintains 150 p.s.i. gauge pressure on the system, is protected by means of an over-pressure switch, an under-pressure switch, and a line filter. The test apparatus has two heated units, the preheater and the filter body. The preheater consists of an aluminum outer tube and a 7/16-inch outside diameter by 18-inch aluminum inner tube in which a heating element is inserted in a manner such that the feed stock is heated as it flows between the outer and the inner tube. The heated filter section contains a sintered stainless steel filter disk which traps carbonaceous material. A 30-inch mercury manometer is used to measure the pressure drop across the filter. A three-valve by-pass system is installed so that the feed stock may by-pass the filter if the pressure drop exceeds about 26 inches of mercury. The feed stock flows from the filter through a water cooler and a flow control needle valve, which is protected by a line filter, to the spent feed stock reservoir. In preparation for the test, the preheater and filter units are disassembled and thoroughly cleaned with solvent, scouring powder, and once more with solvent. After having dried, the units are reassembled and the preheater tube, which has been polished to a mirror finish using a good grade of metal polish, is installed. The entire system is then cleaned again by pumping about one gallon of solvent (for example, a mixture of equal volumes of benzene, acetone, and isopropanol) through the apparatus. During this cleaning period the filter does not contain the sintered disk. After the solvent has been drained from the apparatus, a new sintered filter disk is inserted and the unit is ready for the test.

Five gallons of filtered hydrocarbon feed stock is charged to the reservoir and air is blown through the feed stock by means of a fritted glass dispersion tube for 3 minutes. The feed stock is then pumped through the apparatus for 10 minutes, during which time the flow rate is adjusted to 6±0.1 pounds per hour by means of a flow control valve and the rotameter. The test is then started by turning on the heaters and routing the discharge feed stock to the feed stock reservoir. The test temperatures (preheater at 400°±5° F. and filter at 500°±10° F.) should be obtained in approximately 10 minutes, at which time the manometer is adjusted for the initial reading. The time when the test temperatures are reached is noted as "apparatus prepared for test." The test period consists of 300 minutes during which the temperatures of the apparatus are maintained by adjusting the wattmeters which form an integral part of the test apparatus. The flow rate is controlled by means of the rotameter and is checked by hourly weighings. The pressure drop across the filter is also recorded at periodic intervals. If the pressure drop exceeds 26 inches of mercury, the by-pass valve is opened and the test is continued for the prescribed total of 300 minutes. At the end of the test, the heaters are turned off and the unit is cooled to 150° F. with the test feed stock in it, and then the unit is drained and disassembled for inspection. The pressure drop across the filter and the deposits on the preheater tube are recorded.

The results in Table II shown the beneficial effects of an acylated amine of the present invention and of a mixture thereof with an alkylphenol-formaldehyde-amine reaction product in inhibiting the accumulation of carbonaceous material on the preheater tube and the filter of the test apparatus, as shown by the deposits on the preheater tube and the pressure drop across the filter, respectively. A large pressure drop indicates the accumulation of a considerable amount of carbonaceous material on the filter. Conversely, a small pressure drop indicates that little carbonaceous material has deposited on the filter. It will be noted that the alkylphenolformaldehyde-amine product alone was not very effective, but that it was beneficial when used in combination with an acylated amine.

TABLE II.—CFR FUEL COKER TEST

| Hydrocarbon feed stock; 1:1 by weight mixture of gas oil and kerosene plus— | Deposits on preheater tube | Pressure drop across the filter in inches of mercury |
|---|---|---|
| A. (Control) | Very heavy | [1] 25.2 |
| B. 0.0066% of the alkylphenol-formaldehyde-amine reaction product of Example 8 (contains 30% of xylene solvent). | Moderately heavy | 20.5 |
| C. 0.0066% of the acylated amine of Example 6 (contains 30% of the xylene solvent). | Very light | 0.15 |
| D. 0.0066% of a 3:1 weight mixture of the products of Examples 6 and 8, respectively (contains 30% of xylene solvent). | do | 0.10 |
| E. 0.0077% of the acylated amine of Example 7 (contains 40% SAE 10 mineral oil). | Light | 0.1 |

[1] This pressure drop occurred after 103 minutes and the by-pass valve opened at this time.

A field test of additive combination D of Table II in a catalytic cracking refinery unit operating on a gas oil feed stock (additive present in the amount of 30 pounds per thousand barrels of gas oil feed stock or approximately 0.01 weight percent) indicates that the period between downtime for cleaning can be extended substantially by the use of this additive combination.

What is claimed is:

1. A method for inhibiting the accumulation of carbonaceous material in a refinery cracking unit during the cracking of a hydrocarbon feed stock therein which comprises dissolving in said feed stock a minor proportion of an oil-soluble acylated amine prepared by mixing a substituted succinic compound selected from the class consisting of substituted succinic acids having the structural formula

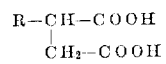

and substituted succinic anhydrides having the structural formula

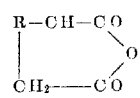

in which structural formulas R is a large hydrocarbon radical having at least about 50 carbon atoms, said radical being at least about 70 percent aliphatic, with at least about one-half an equivalent amount of an amine selected from the group consisting of alkylene amines and hydroxyalkyl substituted alkylene amines, and heating the resulting mixture to effect acylation and remove the water formed thereby.

2. A method in accordance with claim 1 further characterized in that at least about 0.0012 weight percent of said acylated amine is dissolved in said hydrocarbon feed stock.

3. A method in accordance with claim 1 further characterized in that R of the substituted succinic compound contains at least about 60 carbon atoms.

4. A method in accordance with claim 1 further characterized in that R of the substituted succinic compound is a radical derived from a substantially aliphatic polyolefin.

5. A method in accordance with claim 1 further characterized in that the amine is an alkylene amine.

6. A method for inhibiting the accumulation of carbonaceous material in a refinery cracking unit during the cracking of a hydrocarbon feed stock therein which comprises dissolving in said feed stock from about 0.0012 to about 0.04 weight percent of an oil-soluble acylated amine prepared by mixing a substituted succinic compound selected from the class consisting of substituted succinic acids having the structural formula

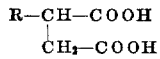

and substituted succinic anhydrides having the structural formula

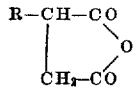

in which structural formulas R is a radical derived from a polyisobutene containing an average from about 100 to about 130 carbon atoms, with about 1 to about 4 equivalents of an ethylene amine per equivalent of substituted succinic compound, and heating the resulting mixture to effect acylation and remove the water formed thereby.

7. A method in accordance with claim 6 further characterized in that the ethylene amine is a mixture of diethylene triamine and triethylene tetramine.

8. A method in accordance with claim 1 further characterized in that the feed stock additionally contains a minor proportion of a product prepared by heating one equivalent of an alkylphenol with from about 0.1 to about 10 equivalents each of a formaldehyde-yielding reagent and an amine for about 0.5 to about 10 hours at 80°–250° C. and removing the water which is formed.

9. A method in accordance with claim 8 characterized further in that the alkylphenol is heptylphenol, the formaldehyde-yielding reagent is paraformaldehyde, and the amine is a mixture of ethylene amines having a composition corresponding to that of tetraethylene pentamine.

*10. A method for inhibiting the accumulation of carbonaceous material in a refinery unit during the passage of a hydrocarbon feed stock therethrough which comprises dissolving in said feed stock a minor proportion of an oil-soluble acylated amine prepared by mixing a substituted succinic compound selected from the class consisting of substituted succinic acids having the structural formula*

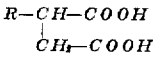

*and substituted succinic anhydrides having the structural formula*

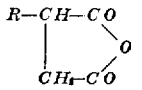

*in which structural formulas R is a large hydrocarbon radical having at least about 50 carbon atoms, said radical being at least about 70 percent aliphatic, with at least about one-half an equivalent amount of an amine selected from the group consisting of alkylene amines and hydroxyalkyl substituted alkylene amines, and heating the resulting mixture to effect acylation and remove the water formed thereby.*

*11. The method of claim 10 wherein the refinery unit is a preheating unit.*

*12. A method in accordance with claim 11 further characterized in that at least about 0.0012 weight percent of said acylated amine is dissolved in said hydrocarbon feed stock.*

*13. A method in accordance with claim 11 further characterized in that R of the substituted succinic compound contains at least about 60 carbon atoms.*

*14. A method in accordance with claim 11 further characterized in that R of the substituted succinic compound is a radical derived from a substantially aliphatic polyolefin.*

*15. A method in accordance with claim 11 further characterized in that the amine is an alkylene amine.*

*16. A method for inhibiting the accumulation of carbonaceous material in a refinery preheating unit during the passage of a hydrocarbon feed stock therethrough*

*which comprises dissolving in said feed stock from about 0.0012 to about 0.04 weight percent of an oil-soluble acylated amine prepared by mixing a substituted succinic compound selected from the class consisting of substituted succinic acids having the structural formula*

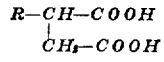

*and substituted succinic anhydrides having the structural formula*

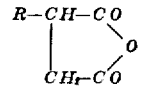

*in which structural formulas R is a radical derived from a polyisobutene containing an average from about 100 to about 130 carbon atoms, with about 1 to about 4 equivalents of an ethylene amine per equivalent of substituted succinic compound, and heating the resulting mixture to effect acylation and remove the water formed thereby.*

*17. A method in accordance with claim 16 further characterized in that the ethylene amine is a mixture of diethylene triamine and triethylene tetramine.*

*18. A method in accordance with claim 11 further characterized in that the feed stock additionally contains a minor proportion of a product prepared by heating one equivalent of an alkylphenol with from about 0.1 to about 10 equivalents each of a formaldehyde-yielding reagent and an amine for about 0.5 to about 10 hours at 80°–250° C. and removing the water which is formed.*

*19. A method in accordance with claim 18 characterized further in that the alkyphenol is heptylphenol, the formaldehyde-yielding reagent is paraformaldehyde, and the amine is a mixture of ethylene amines having a composition corresponding to that of tetraethylene pentamine.*

*20. The method of claim 10 wherein the refinery unit is a cracking unit.*

*21. A method in accordance with claim 20 further characterized in that at least about 0.0012 weight percent of said acylated amine is dissolved in said hydrocarbon feed stock.*

*22. A method in accordance with claim 20 further characterized in that R of the substituted succinic compound is a radical containing at least about 60 carbon atoms and derived from a substantially aliphatic polyolefin.*

*23. A method for inhibiting the accumulation of carbonaceous material in a refinery cracking unit during the passage of a hydrocarbon feed stock therethrough which comprises dissolving in said feed stock from about 0.0012 to about 0.04 weight percent of an oil-soluble acylated amine prepared by mixing a substituted succinic compound selected from the class consisting of substituted succinic acids having the structural formula*

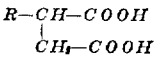

*and substituted succinic anhydrides having the structural formula*

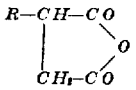

*in which structural formulas R is a radical derived from a polyisobutene containing an average from about 100 to about 130 carbon atoms, with from about 1 to about 4 equivalents of an ethylene amine per equivalent of substituted succinic compound, and heating the resulting mixture —to effect acylation and remove the water formed thereby.*

*24. A method in accordance with claim 23 further characterized in that the ethylene amine is a mixture of diethylene triamine and triethylene tetramine.*

*25. A method in accordance with claim 20 further*

*characterized in that the feed stock additional contains a minor proportion of a product prepared by heating one equivalent of an alkylphenol with from about 0.1 to about 10 equivalents each of a formaldehyde-yielding reagent and an amine for about 0.5 to about 10 hours at 80°–250° C. and removing the water which is formed.*

References Cited

The following references, cited by the Examiner, are of record in the patented file of this patent or the original patent.

UNITED STATES PATENTS

| | | | |
|---|---|---|---|
| 2,867,515 | 1/1959 | Andress | 44—71 |
| 3,018,250 | 1/1962 | Anderson et al. | 252—51.5 |
| 3,024,237 | 3/1962 | Drummond et al. | 252—5.15 |

DELBERT E. GANTZ, *Primary Examiner.*

PAUL M. COUGHLAN, JR., *Examiner.*

G. E. SCHMITKONS, *Assistant Examiner.*